United States Patent [19]

Sasaki et al.

[11] Patent Number: 4,761,557

[45] Date of Patent: Aug. 2, 1988

[54] IONIZATION-TYPE SMOKE DETECTOR

[75] Inventors: Toru Sasaki; Yoshinori Igarashi, both of Tokyo, Japan

[73] Assignee: Kohmi Bosai Kogyo Co., Ltd., Tokyo, Japan

[21] Appl. No.: 897,617

[22] Filed: Aug. 18, 1986

[30] Foreign Application Priority Data

Aug. 24, 1985 [JP] Japan .......................... 60-129057[U]
Sep. 28, 1985 [JP] Japan .......................... 60-147332[U]
Sep. 30, 1985 [JP] Japan .......................... 60-148145[U]

[51] Int. Cl.[4] ...................... H01J 47/00; G01N 27/64

[52] U.S. Cl. ................................... 250/381; 250/382; 250/384; 250/385.1

[58] Field of Search .................. 250/384, 385 R, 382, 250/381; 340/629, 628, 579

[56] References Cited

U.S. PATENT DOCUMENTS 4,396,840 8/1983 Araki et al. ........................ 250/381

FOREIGN PATENT DOCUMENTS

85/01111 3/1985 World Int. Prop. O. .......... 340/629
85/01110 3/1985 World Int. Prop. O. .......... 340/629

*Primary Examiner*—Janice A. Howell
*Assistant Examiner*—Constantine Hannaher
*Attorney, Agent, or Firm*—Tilton, Fallon, Lungmus & Chestnut

[57] ABSTRACT

In order to provide an ionization-type smoke detector, wherein the radiation from a radioactive source mounted on the inner electrode disposed within the inner ionization chamber also reaches into the outer ionization chamber through a through-hole formed in the intermediate electrode, which is easy to assemble and which has a constitution to prevent scattering of the radioactive source even though inner and outer ionization chambers are provided with the insulation base board for supporting the inner and intermediate electrodes at a predetermined spacing is connected to the printed circuit board by a mounting rod, and the outer electrode surrounding the intermediate electrode and the insulation base board with smoke inlet openings is connected at its end periphery to the printed circuit board, the printed circuit board being connected to the base of the detector by connecting pins.

4 Claims, 1 Drawing Sheet

IONIZATION-TYPE SMOKE DETECTOR

BACKGROUND OF THE INVENTION

The present invention relates to a smoke detector, and more particularly to an ionization-type smoke detector.

An ionization-type smoke detector has been known in which an ionization chamber is provided to detect the presence of smoke, and when smoke enters the ionization chamber the change in the ion current therein is transformed into an alarm signal, issuing a fire alarm.

Although it has been known in a smoke detector of this kind to provide only one ionization chamber, this has such a drawback in that its sensitivity is affected by changes in characteristics in regards to change in environmental temperature, or gradual increases in smoke concentration.

To avoid such a drawback, an ionization-type smoke detector has already been proposed in which in addition to an outer ionization chamber into or out of which environmental air is free to enter or exit, there is an inner ionization chamber which has a hermetically sealed mechanism independent from the environment, the inner electrode within the inner ionization chamber mounting a radioactive source, the radiation of the radio active source able to penetrate into the outer ionization chamber through a through-hole formed axially of the intermediate electrode. Further, it has also been proposed that in order to prevent the radioactive source being contained in the detector from scattering outwards when the outer case made of synthetic resin is melted due to a fire, the radioactive source be encased within a metallic case so that it can fall to the floor together with the case.

Thus, it will be understood that hitherto known ionization-type smoke detectors have required a detector base board having a complicated construction, and since the main components of the detector such as the inner, intermediate and outer electrodes are mounted on the base board by screws, pins, etc. it has a complicated construction, requiring long assembly time, making for poor productivity.

Further, since the shield case and the case for preventing the radioactive source from scattering outside in case of the fire are independently made of metal or other suitable material the cost of the detector becomes more expensive.

SUMMARY OF THE INVENTION

It is a primary object of the present invention to provide an ionization-type smoke detector which can eliminate substantially all of the drawbacks exemplified above inherent in conventional smoke detectors of this kind.

It is another object of the present invention to provide an ionization-type smoke detector in which the means for preventing the radioactive source from scattering outside in case of fire and the means for electrical protection of the electrical circuit such as an electrical shield have a simple construction, allowing easy assembly even though inner and outer ionization chambers are provided.

It is a further object of the present invention to provide an ionization-type smoke detector in which the radioactive source can be retained within the shield case even if the detector falls, for example, from the ceiling to which it is mounted onto the floor, so that the scattering of the radioactive source outside is effectively prevented.

In accordance with the present invention an ionization-type smoke detector in which the radioactive source mounted on the inner electrode within the inner ionization chamber also radiates into the outer ionization chamber via a through-hole formed axially of the intermediate electrode is provided wherein the insulation base board supporting the inner and intermediate electrodes at a predetermined distance is mounted on the printed circuit board through a rod for mounting the inner electrode, and the intermediate electrode and the outer electrode surrounding the insulation base board and having smoke inlet openings are mounted on the printed circuit board by the upper end portions thereof, respectively, and the printed circuit board is mounted on the base board of the detector by connecting pins.

BRIEF DESCRIPTION OF THE DRAWINGS

The above brief description, as well as further objects, features and advantages of the present invention will be more fully understood by reference to the following detailed description of the presently preferred, but nonetheless illustrative embodiment, in accordance with the present invention, in the accompanying drawings, wherein.

DESCRIPTION OF THE PREFERRED EMBODIMENT

Figure 1:
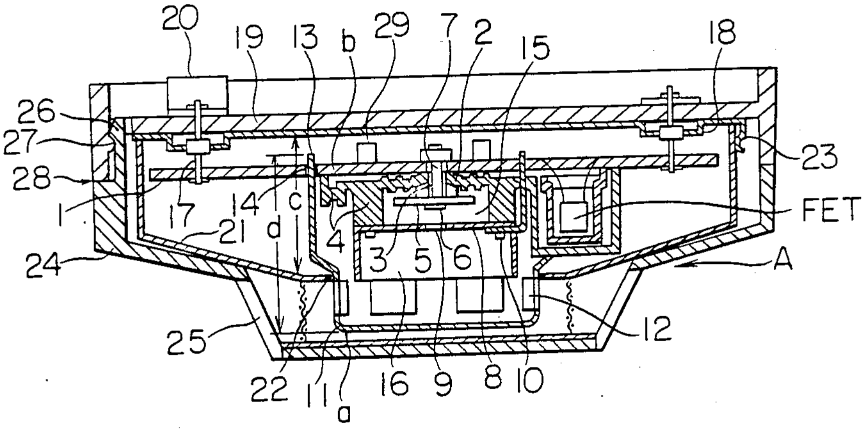
FIG. 1 is a side elevational view of one embodiment of the present invention in section.

Referring now to FIG. 1 of the drawings, reference character A designate an ionization-type smoke detector, reference numeral 1 a printed circuit board provided with detecting circuits containing a field effect transistor FET, the circuit board also having an insulation base board 2 to support the inner electrode 5 and the intermediate electrode 8 at a predetermined spacing.

The insulation base board 2 is formed centrally thereof with a through-hole 3 and peripherally with a plurality of supporting rods 4 for supporting the intermediate electrode 8, the inner electrode 5 being screwed to the printed circuit board 1 by a mounting rod 7 passing through the through-hole 3 formed in the insulation board 2.

The intermediate electrode 8 is secured to the insulation board 2 by screwing the electrode 8 to the supporting rods 4 as at 10. In this case the central through-hole 9 formed in the intermediate electrode 8 is caused to confront the radioactive source 6 mounted on the inner electrode 5.

The intermediate electrode 8 and the insulation base board 2 are surrounded by a cylindrical outer electrode 11 which has a small diameter portion a formed with smoke inlet openings 12 and a large diameter portion b which has a number of engaging pieces 13 protruding from its end periphery, said pieces being adapted to be introduced into the corresponding openings 14 formed in the printed circuit board 1 and clamped or soldered thereto.

Defined between the inner electrode 5 and the intermediate electrode 8 is an inner ionization chamber 15, the air within this chamber 15 being ionized by the radioactive source 6, and in this case the air within the outer ionization chamber 16 which is defined between the intermediate and outer electrodes 8, 11 is also ionized by the radiation penetrating into it through the central through-hole 9 formed in the intermediate electrode 8.

The printed circuit board 1 is secured to a detector base board 19 by connecting pins 17 provided with a cap-like shield plate 18 made of metal, one end of the pins 17 passing through the printed circuit board 1, and the other ends connected to connecting terminal members 20 at the opposite side of the detector base board 19 to be secured to the connecting terminal members 20 through such means as soldering. The connecting terminal members 20 serve to connect themselves mechanically and electrically to the corresponding connecting terminal members (not shown) of the base mounted on the ceiling of a room within which the smoke detector is to be installed. As the fixing means, passing-through condensers may be utilized instead of the connecting pins 17.

The cap-like shield plate 18 is provided at its periphery with a number of spring means 23 which serve to firmly elastically hold the outer periphery of a cup-shaped shield case 21 which has a shape to surround the large diameter portion b of the outer electrode 11 and the printed circuit board 1, and which is formed with an opening 22 to loosely fit the small diameter portion a of the outer electrode 11. The height c of the shield case 21 is so selected that it is substantially equal to or less than the height d of the outer electrode 11.

The shield case 21 and the detector base board 19 are further surrounded by a detector cover 24 provided with smoke inlet openings 25, and the cover 24 is integrally secured to the base board 19 by engaging the hook-like engaging pieces 26 protruded from the upper end periphery with the stepped engaging portions 27 formed in the inner periphery of the base board 19.

The outer electrode 11 is provided at its large diameter portion b with a number of protruding pieces 29 the height of each of which is so selected that even if the shield plate 18 is deflected the contact of the shield plate 18 with the electrical parts on the printed circuit board 1 is still effectively prevented.

Since the smoke detector according to the present invention has such a construction as described above, in assembly the printed circuit board 1 is first secured to the insulation board 2 by fastening the mounting rod 7 of the inner electrode 5 between them, the intermediate electrode 8 being screwed to the insulation base board 2, and the outer electrode 11 then being secured to the printed circuit board 1 by inserting the engaging pieces 13 of the former into the corresponding openings 14 of the latter to be rigidly fastened together. Thus the intermediate electrode 8 and the insulation base board 2 are surrounded by the outer electrode 11. Thereafter the printed circuit board 1 is mounted to the base board 19 of the detector by the connecting pins 17 provided from shield plate 18, the cup-shaped shield case 21 being trapped by the spring means 13 integrally formed around the shield plate 18 after the opening 22 formed centrally of the shield case 21 passed through the small diameter portion a of the outer electrode 11.

The following describes the operation of the smoke detector according to the present invention after having thus been assembled.

The radioactive source 6 mounted on the inner electrode 5 ionizes the air within the inner ionization chamber 15 as well as the outer ionization chamber 16 through the central through-hole 9 formed in the intermediate electrode 8. In this condition, should there be a fire and the resulting smoke having a predetermined concentration enters the outer ionization chamber 16 through the smoke inlet openings 25 and 12 formed in the cover 24 and the outer electrode 22, respectively, the ionization current flowing between the outer and intermediate electrodes 11 and 8 decreases by a predetermined value. This change in electrical current is detected by the detecting circuit of the printed circuit board 1, and transmitted to the receiver (not shown) through the connecting terminal members 20 and electrical wires to report the occurrence of a fire.

After the outbreak of the fire has been reported, if the fire further develops and increases in temperature, the detector cover 24 will start to melt and the solder holding the connecting pins 17 and the connecting terminal members 20 together will also eventually melt, so that the detector will drop from the ceiling onto the floor.

Figure 2:
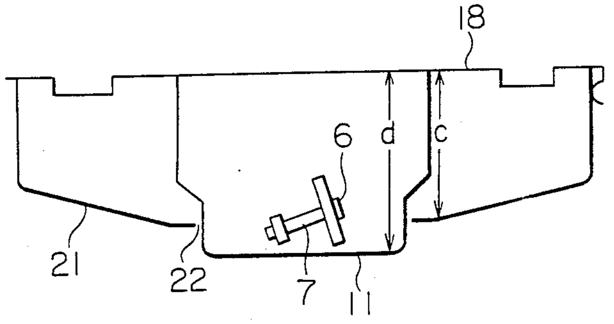
FIGS. 2 and 3 illustrate schematically the relationships between the outer electrode and the shield casing shown in FIG. 1 after the detector shown in FIG. 1 falls from the ceiling onto the floor in case of fire. These figures exemplify the two typical configuration conceivable.
Figure 3:
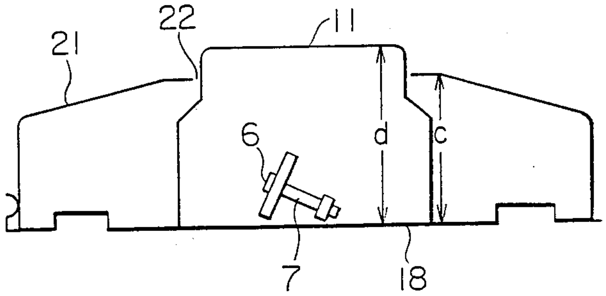

In this case, even if the outer cover 24 of the smoke detector has substantially melted, since the shapes and height dimensions of the outer electrode 11 and the shield case 21 are suitably selected, the shield casing comprising the shield plate 18 and the shield case 21 is in a state as indicated in FIG. 2 or 3 after it has dropped onto the floor. Thus, it will be appreciated that even if the shield casing has dropped onto the floor the radioactive source 6 will still be retained within the metallic shield casing, not being scattered outside.

Further, even if the detector case 28 becomes deformed, or the shield casing 18, 21 itself becomes deformed, due to deterioration of material with time, resultant slacking of the shield plate 18 downwards is blocked by the protruding pieces 29 of the outer electrode 11, thus preventing contact of the shield plate 18 with the electrical parts of the printed circuit board 1. Although such deformation may also be caused by vibration carried through the surface of the ceiling on which the smoke detector is mounted the possible contact of the shield plate 18 with the electrical parts of the printed circuit board 1 can be similarly prevented by the protruding pieces 29 formed on the outer electrode 11.

From the foregoing it will be appreciated that the present invention reveals such various excellent effects as exemplified below:

(i) The quantity of screws, pins, etc. which require a relatively long time for assembly can be reduced a great deal;

(ii) The assembly time is therefore, shortened, improving productivity;

(iii) since (a) the printed circuit board 1 is mounted on the detector base board 19 by connecting pins 17, the baseboard 19 being provided with a cap-like shield plate 18 and (b) the cup-shaped shield case 21 which has a height less than the height d of the outer electrode 11 and is formed with an opening 22 to loosely fit the small diameter portion of the outer electrode surrounds the large diameter portion a of the outer electrode 11 and the printed circuit board 1 and (c) they are all surrounded by the cup-shaped detector case 28 formed with smoke inlet openings 25, even if the detector may drop from the ceiling onto the floor due to the melting of the solder connecting the connecting pins to the detection base board by a fire the radioactive source remains within the shield casing, to effectively prevent scattering of the radioactive source outside; and (iv) An inexpensive ionization type smoke detector with less height or smaller size and well protected electrical circuits can be obtained.

As will be readily apparent to those skilled in the art, the present invention may be realized in other specific forms without departing from its spirit or essential characteristics. The embodiment is, therefore, to be considered as illustrative and not restrictive, the scope of the present invention being indicated by the claims rather than by the foregoing description, and all changes which come within the meaning and range of the equivalents of the claims are therefore intended to be embraced therein.

What is claimed is:

1. An ionization-type smoke detector wherein radiation from a radioactive source mounted on an inner electrode disposed within an inner ionization chamber also reaches an outer ionization chamber through a through-hole formed in an intermediate electrode, said smoke detector comprising a detector base board, a printed circuit board mounted on said detector baseboard in spaced relation thereto, an insulation base board mounted on said printed circuit board and supporting said inner and intermediate electrodes in predetermined spaced relation, a mounting rod connecting said insulation base board to said printed circuit board by fixing said inner electrode to said printed circuit board, an outer electrode being connected at one of the ends thereof to said printed circuit board, and connecting pins to rigidly connect said printed circuit board to said detector base board, said connecting pins mounting a cap-shield plate made of metal, a cup-shaped shield case surrounding said outer electrode and said printed circuit board and means on said shield plate to hold said cup-shaped shield case at the periphery of its open end to said shield plate.

2. An ionization-type smoke detector as claimed in claim 1 wherein said outer electrode comprises two integral concentric cylindrical bodies having small and large diameters, respectively, said outer electrode adapted to surround said intermediate electrode and said insulation base board, said large diameter cylindrical body being equipped with engaging pieces with three ends protruding therefrom, said large cylindrical body being connected to said printed circuit board by inserting said free end portions of said engaging pieces into corresponding openings formed in said printed circuit board, said shield case having a cup-shaped configuration with a central hole to loosely fit said small diameter cylindrical body and the height of said shield case being less than the height of said outer electrode such that said shield case surrounds said large diameter cylindrical body of said outer electrode and said printed circuit board.

3. An ionization-type smoke detector as claimed in claim 2 wherein said outer electrode is provided at the periphery of its open end with protruding engaging pieces to be engaged with said printed circuit board and protruded pieces to keep a space between said shield plate and said printed circuit board.

4. An ionization type smoke detector comprising a detector case having smoke inlet openings and a detector baseboard cover, a printed circuit board secured in vertically spaced relation to said detector baseboard, ionization electrode means including a radioactive source secured to said printed circuit board, a shield plate secured to said baseboard between said baseboard and said printed circuit board, and a shield case secured to said shield plate and substantially surrounding said printed circuit board and electrode means to prevent scattering of the same upon fusion of said detector case and detector baseboard.

* * * * *